US005398115A

United States Patent [19]

Lin

[11] Patent Number: 5,398,115
[45] Date of Patent: Mar. 14, 1995

[54] FACSIMILE COMMUNICATION FOR LOCATING AND TRANSMITTING INFORMATION FROM A DOCUMENT TO SELECTIVE CALL RECEIVERS

[76] Inventor: Iyh-Han Lin, 8846 Andy Ct. #D, Boynton Beach, Fla. 33426

[21] Appl. No.: 201,518

[22] Filed: Feb. 24, 1994

[51] Int. Cl.$^6$ .................... H04N 1/00; H04N 1/387; H04M 11/00; H04B 7/00
[52] U.S. Cl. .................... 358/407; 358/453; 379/58; 379/100; 455/38.4; 455/53.1
[58] Field of Search .............. 358/406, 453, 462, 468; 382/61; 340/311.1, 825.44; 379/58, 59, 100, 96; 455/31.1, 38.1, 38.4, 53.1, 54.1

[56] References Cited

U.S. PATENT DOCUMENTS

| | | | |
|---|---|---|---|
| 4,558,374 | 12/1985 | Kurata et al. | 382/61 |
| 4,760,247 | 7/1988 | Keane et al. | 382/61 |
| 4,897,733 | 1/1990 | Sakaguchi et al. | |
| 4,920,427 | 4/1990 | Hirata. | |
| 5,023,905 | 6/1991 | Wells et al. | 340/825.44 |
| 5,038,393 | 8/1991 | Nanba | 382/61 |

*Primary Examiner*—Scott A. Rogers
*Attorney, Agent, or Firm*—Keith A. Chanroo; John H. Moore

[57] ABSTRACT

A selective call communication system (100) includes a scanner (14) for retrieving information from a source document. (26) The source document (26) has the information being located relative to at least three markers (50–54). The scanner (14) further includes an encoder (34) for encoding and compressing the information; and a modem (36), coupled to the encoder (34), for transferring the information and the at least three markers (50–54) to a selective call terminal (28). The selective call terminal (28) includes a receiver (202) for receiving the information and the at least three markers (50–54); and a processor (20) for processing the information and the at least three markers (50–54). The processor (20) further includes a marker locator (204) for searching for the at least three markers (50–54); and a determinator (216), coupled to said marker locator (204), for determining a location of the information. A transmitter (30, 32), coupled to the processor (20), transmits the information being processed to an at least one selective call receiver (40).

12 Claims, 6 Drawing Sheets

FACSIMILE COMMUNICATION FOR LOCATING AND TRANSMITTING INFORMATION FROM A DOCUMENT TO SELECTIVE CALL RECEIVERS

FIELD OF THE INVENTION

This invention relates in general to facsimile communications and more specifically to a method and apparatus for providing facsimile communication with selective call receivers.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code) or POCSAG (Great Britain's Post Office Code Standardisation Advisory Group). To originate a message or page, a base station (or selective call terminal) is typically accessed via a Public Switch Telephone Network (PSTN) from a telephone. As a voice message entry device, the telephone is acceptable but when data needs to be entered, an alternative means of entry is desirable. Alternative entry devices such as computer terminals or custom entry devices work well if the originator can convey information to the user in a textual format. Unfortunately, when a user must convey a large amount of information or graphics-type information, existing selective call messaging (paging) systems and data transport protocols do not gracefully allow for the transmission of either long textual messages or messages containing graphical data. This is because selective call receivers are powered by limited energy content battery supplies that are quickly degraded when receiving and displaying long messages. In addition, because of the miniature size of the selective call receiver and its display, the information received is not easily readable and accessible to the user.

While contemporary facsimile communication equipment employ data compression techniques in their coding formats, such data compression techniques are inadequate for adequately preserving the battery lives of the selective call receivers. Furthermore, the long data messages indicative of facsimile communication would also destroy the battery saving schemes currently being employed with selective call communication systems. Therefore, because in facsimile communications long textual or graphical information are transmitted to the selective call receivers, the selective call receivers' battery lives are severely degraded. This makes facsimile communication unattractive to the users of selective call receivers even though the need exists.

Thus, what is needed is a method and apparatus, in a selective call communication system, for providing facsimile communication that is designed specifically to meet these constraints, namely, a significant reduction in the time for processing the information while minimizing such errors as scaling and translation of the information for making the information suitable for display on a miniature display screen.

SUMMARY OF THE INVENTION

In a selective call communication system, a method of facsimile communication comprises the steps of (a) retrieving information from a source document. The source document has the information located relative to at least three markers. The method further comprises: (b) encoding and compressing the information; (c) transferring the information and the at least three markers to a selective call terminal; (d) receiving the information and the at least three markers at the selective call terminal; (e) processing the information and the at least three markers. The step of processing in the selective call terminal further comprises the steps of: (f) searching for the at least three markers; (g) determining a location of the information in response to the step (f) of searching; and (i) transmitting the information being processed to an at least one selective call receiver.

A selective call communication system comprises a scanner for retrieving information from a source document. The source document has the information located relative to at least three markers. The scanner further comprises: an encoder for encoding and compressing the information; and a modem, coupled to the encoder, for transferring the information and the at least three markers to a selective call terminal. The selective call terminal comprises: a receiver for receiving the information and the at least three markers; and a processor, coupled to the receiver, for processing the information and the at least three markers. The processor further comprises a marker locator for searching for the at least three markers; and a determinator, coupled to the marker locator, for determining a location of the information. A transmitter, coupled to the processor, transmits the information being processed to an at least one selective call receiver.

DESCRIPTION OF A PREFERRED EMBODIMENT

Figure 1:
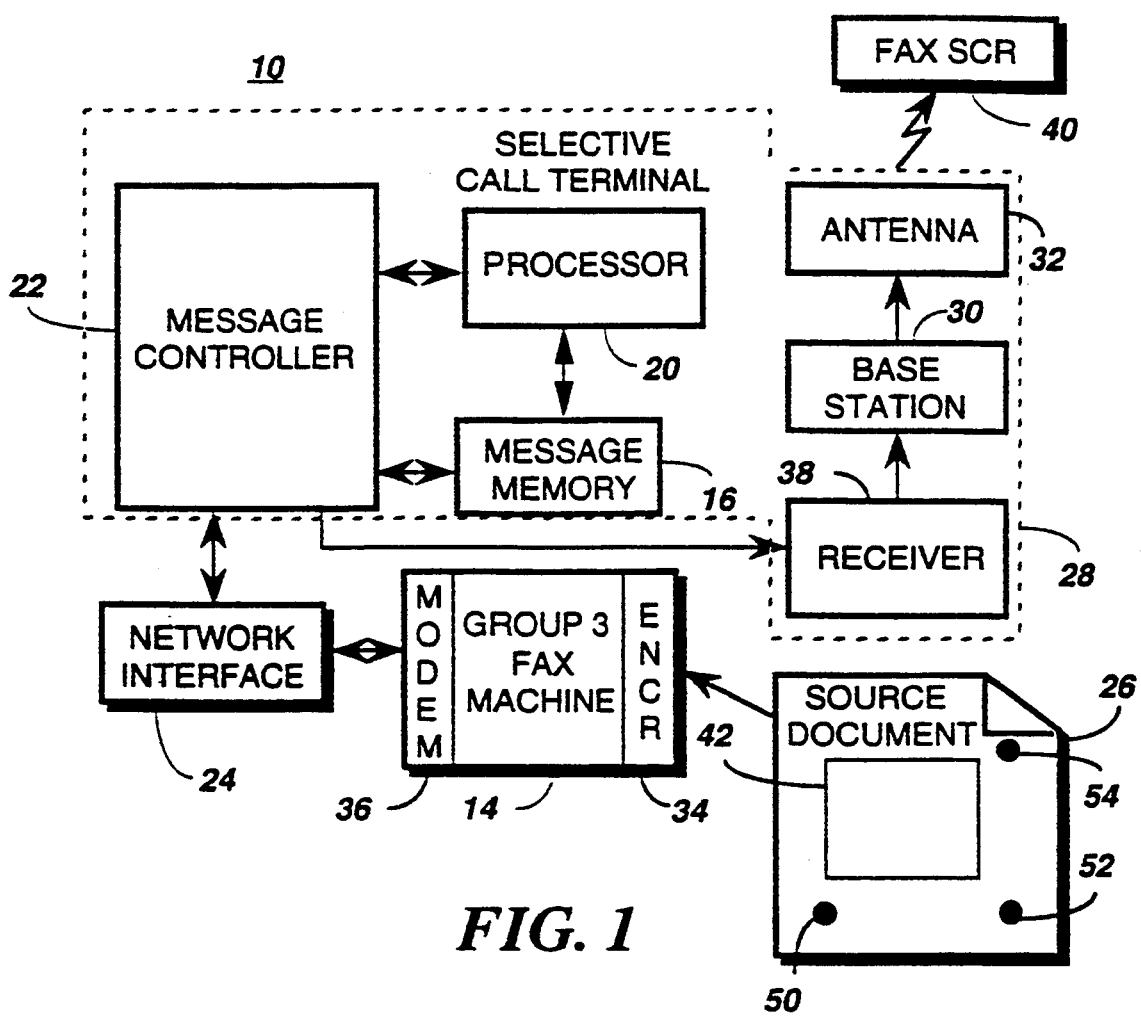
FIG. 1 is an electrical block diagram of a selective call communication system in accordance with the preferred embodiment of the present invention.

Referring to FIG. 1, an electrical block diagram of a selective call communication system 10 is shown in accordance with the preferred embodiment of the present invention. Operationally, a user enters a source document 26 into a facsimile (FAX) machine 14. The FAX machine 14 reads (or scans) and quantizes the image (message or information) contained thereon. As is well known to one of ordinary skill in the art, the FAX machine comprises an encoder 34 and a modem 36 for encoding the received information and transmitting information from the FAX machine 14. Preferably, the information is contained in a predefined information region (information) 42 of the source document 26. The information region 42 is located (or positioned) relative to at least three markers 50-54. The coordinates of the at least three markers 50-54 are located to accurately designate the location of the information 42 on the source document 26. Any variations in the determined locations of the at least three markers 50-54 are used to correct any variations in the location (or position) and scaling of the information 42, the detail will be discussed below.

The FAX machine 14 is coupled to a message controller 22 of a selective call terminal 28 via a network interface 24. The network interface 24, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 needs not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's cap-code (address) and other system information and a message in the information region 42 on the source document 26. Preferably, the information region 42, according to the preferred embodiment of the present invention, is relative to the locations of the at least three markers 50-54. The sender can send a FAX, by alternatively, calling the subscriber's paging service provider using a conventional telephone to enter, for example, the user's cap-code number (a unique number assigned by the paging service provider that corresponds to the actual coded address of a selective call receiver 40) and other system information. The paging service provider maintains a list of FAX capable cap-code numbers (addresses) and upon receiving the entered cap-code number, a procedure to receive a facsimile message is initiated. The user, according to the preferred embodiment, enters the address of the selective call receiver 40 to which the FAX is intended and other system information along with a written text message, data or information. Additionally, the sender can include a drawing, graphics, or other pictorial information on the source document 26. The source document 26 is then scanned into the FAX machine 14. The processing of the information, the hand written message (text information) or graphic information 42 is encoded and compressed by the encoder 34 of the FAX machine 14 and transferred by the modem 36 via the network interface 24 to the selective call terminal 28 which will produce a paging FAX message that will be transmitted to the targeted subscriber. The method, protocol, and apparatus required for the transmission of the paging message will be discussed in detail below.

After the document has been entered into the FAX machine 14, the entire source document 26 including the handwritten message or graphic information contained in the information region 42 is scanned and quantized. Thereafter, the information is encoded and compressed by the encoder 34 in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the information is Group III encoded and compressed, it is transferred by the modem 36 to the message controller 22 via the PSTN 24. The message controller 22 directs the information to a processor 20 for providing additional processing of the information suitable for selective call communication. After storing at least a portion of the information in a message memory 16, the processor 20 and the message controller 22 begin processing the information, the details will be discussed below.

This additional processing according to the preferred embodiment of the present invention is necessary for extending facsimile communication to include selective call communication without destroying the selective call receivers' battery lives and battery saving features. For example, assuming a resolution of 200 by 200 dots-per-inch (dpi) or dots-per-2.5 cm and assuming a message containing 35 lines having an average of 50 characters-per-line on an A4 page size (approximately 21.0 cm by 29.7 cm) containing only text. To transmit this message when compressed, assuming a byte oriented serial protocol with no error correction, would take approximately 155 seconds at 1200 bits-per-second. The resulting transmission time of almost one-hundred-fifty-five seconds-per-page is impractical in terms of the economics of using a radio frequency paging channel. Therefore, there must be a substantial reduction in the processing and transmission times before FAX paging becomes attractive to current subscribers of selective call communication systems.

As can be seen, the transmission of the FAX message must yield an improvement when compared with binary data and Group III facsimile machines. When this example is presented using a typical over-the-air coding scheme such as GSC (Motorola's Golay Sequential Code) or POCSAG (Great Britain's Post Office Code Standardisation Advisory Group), the overhead increases by the amount of parity bits associated with the code selected. This increases the total transmission time by the ratio of the coded data to the un-coded data. In the case of GSC which is a (23,12) code (23 total bits of which 11 are parity bits and 12 are data bits), one would expect to see an increase in time of approximately 109 percent as compared to the un-coded data.

Figure 2:
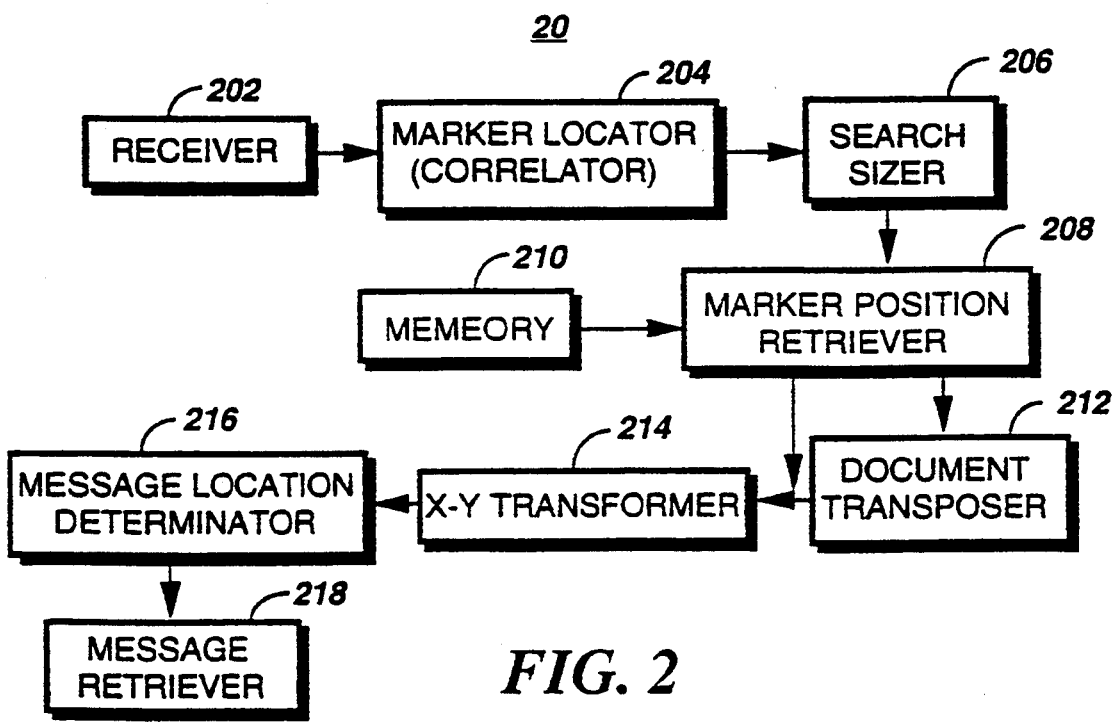
FIG. 2 is an electrical block diagram of a processor of the selective call communication system of FIG. 1.

Referring to FIG. 2, an electrical block diagram of the processor 20 of FIG. 1 is illustrated. When the information is received by a receiver 202 of the processor 20, a marker locator 204 searches the information in the region of interest 42 to identify the at least three marker 50-54. The marker locator 204 is coupled to a search sizer 206. The search sizer 206 selects a first search area and begin its searching in the proximate location of where a first marker 50 is expected. Once the first search area is selected, the marker locator 204 retrieves a stored representation of the marker (prototype of the marker) from memory and begin searching for the marker within the first search area. The search is performed preferably by placing the prototype marker at different locations within the first search area and the result of each location is correlated with the prototype to select the location that best correlates with the marker as the location of the marker. Preferably, a threshold is set to ensure that the integrity of the search is maintained. After marker 50 is found, the marker locator 204 preferably begins to search for marker 52. However, if the marker 52 is not found with the first search area, the search sizer 206 selects a second search area and the process above is repeated to determine when the marker is found. When the marker 52 is not found within the first and second search areas, a document transposer 212 transposes the source document 26 by introducing an off-set factor in the assumption that the source document 26 was rotated by approximately one hundred eighty (180) degrees, and the process of selecting the first and second search areas are repeated to located the markers. Those of ordinary skill in the art will appreciate that more than two search areas can be chosen to locate the markers.

The markers are positioned on the source document 26 to facilitate the precise location of the information region 42. Therefore, when the markers are located, an X-Y transformer 214, coupled to the marker position retriever 208, is able to use the locations of the markers to correct distortions in the X-Y plane introduced by the FAX machine 14 or the transmission over the wireline, such as alignment, rotation, and scaling. Once the markers 50-54 are located, the location and the distance from each other is accurately known, therefore, any changes are a result of rotation, scaling, or alignment. The X-Y transformer 214 uses the difference in the location of a marker from its expected location and the difference in the distance between the markers to compute the rotation, scaling and alignment in the X-Y plane. A message location determinator 216 determines the location of the information region 42 and a message retriever 218 retrieves the message therefrom.

According to the preferred embodiment, the coordinates of each of the marker is preassigned based on an X-Y displacement from each other marker. Therefore, to accurately correct variations in the coordinates in the X-Y plane, at least three markers are needed to correct variations in two dimensions. The at least three markers should be located, preferably in a triangular pattern so the variations in the coordinates in the X-Y planes can be calculated from their respective positions.

When the selective call terminal 28 has completed processing the incoming FAX information, a receiver 38 receives the information and a transmitter which comprises a base station 30 and an antenna 32, broadcasts a signal modulated with FAX information representing the selective call address and the information. A selective call receiver 40 is then able to detect its address, recovers the information, alerts the user, and makes the received information available for presentation to the user in a variety of formats including but not limited to ASCII text, characters, graphics and audio. Some specialized applications that can be accommodated by the preferred embodiment of the selective call communication system 10 are electronic mail, storage, retrieval, and forwarding of facsimile messages, and integration of text with graphics into a compound document architecture compatible with industry standard computer productivity software applications.

Figure 3:
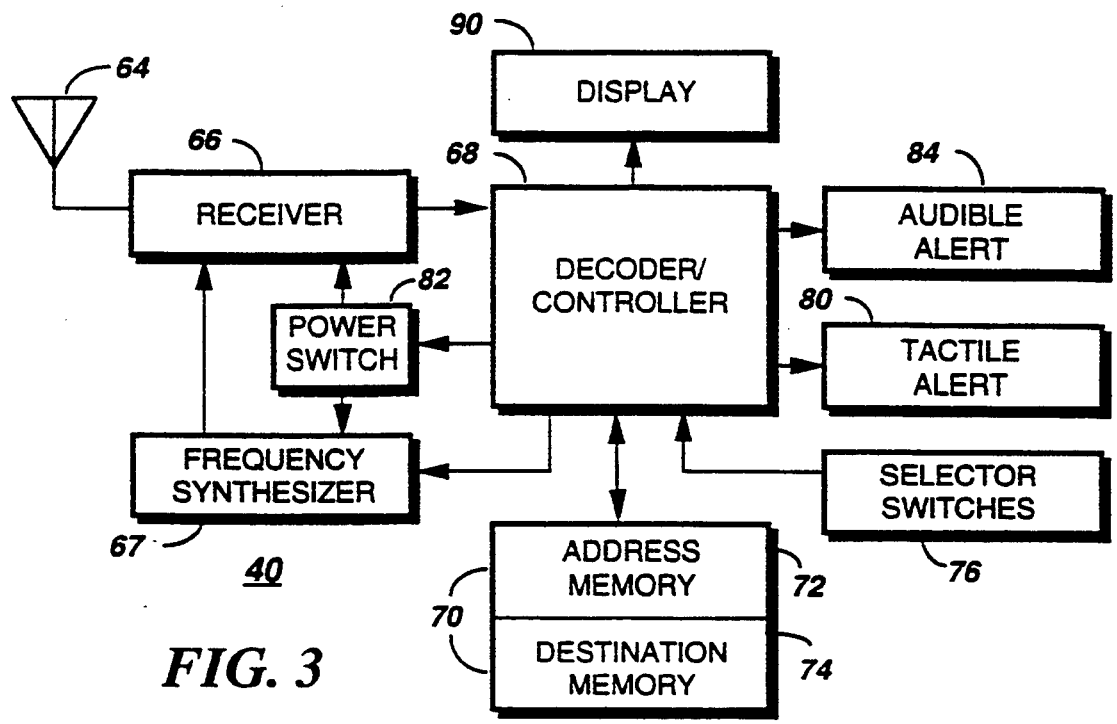
FIG. 3 is an electrical block diagram of a selective call receiver in accordance with the preferred embodiment of the present invention.

Referring to FIG. 3, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as a tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call communication system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 4:
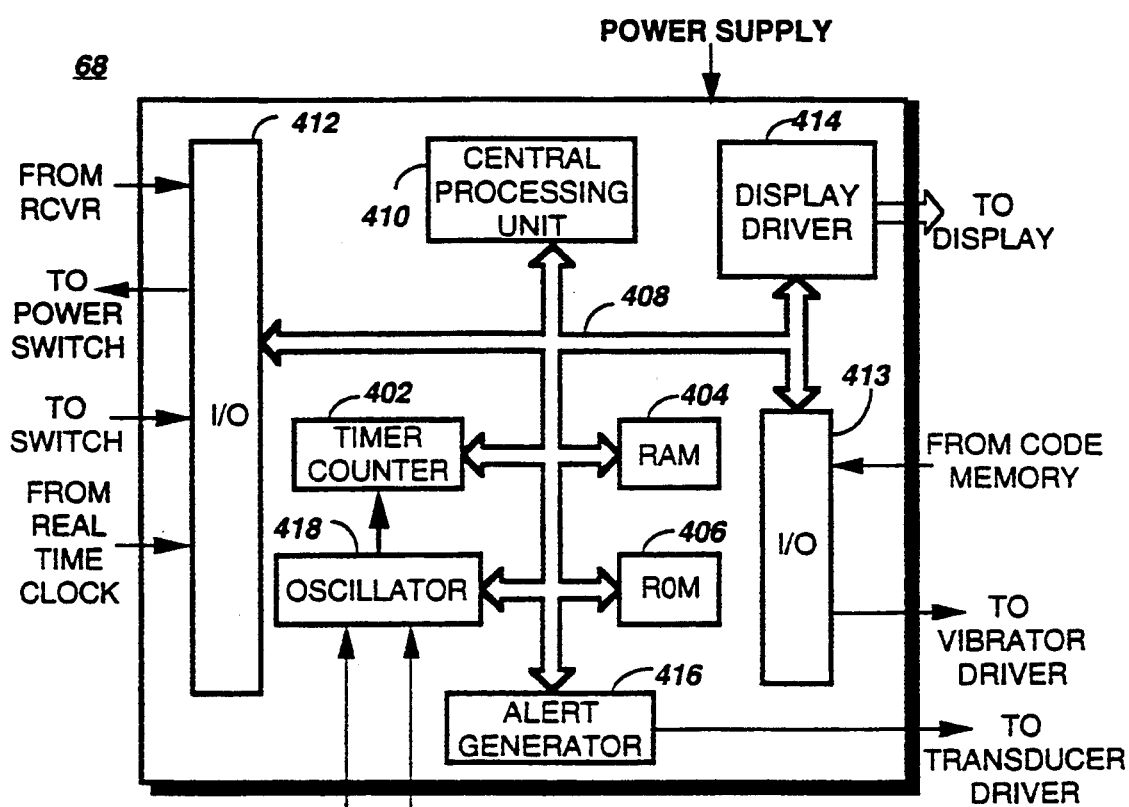
FIG. 4 is an electrical block diagram of a microcomputer based decoder/controller used in the selective call receiver of FIG. 3.

The controller/decoder 68 of FIG. 3 can be implemented utilizing a microcomputer as shown in FIG. 4.

FIG. 4 is an electrical block diagram of a microcomputer based decoder/controller suitable for use in the selective call receiver of FIG. 3. As shown, the microcomputer 68 is preferably of the family of MC68HC05 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of FAX or paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410 and when the received address is the same as that stored within the code-plug memory which couples into the microcomputer through, for example an I/O port 413, the selective call FAX message is received and stored in RAM 404. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display 90 (FIG. 3) such as an LCD (liquid crystal display). It can be appreciated by one of ordinary skill in the art that the display 90 on the selective call receiver 40 is substantially smaller than a computer screen. This difference in size, for example, requires the source document 26 to be partitioned into the information region 42 for receiving the user's text and graphic information. The predefined information region 42 (FIG. 1) is sized such as to enable the FAX information to be easily displayed on the display 90 of the selective call receiver 40 without excessive processing (or manipulation) by the user. When the selective call receiver 40 receives its address, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

The battery saver operation is controlled by the CPU 410. The battery saving signals are directed over the data bus 408 to the I/O port 412 which couples to the power switch 82 (FIG. 3). Power is periodically supplied to the receiver to enable decoding of the received selective call receiver address signals and the selective call composite FAX information which is directed to the selective call receiver 40. The composite information, preferably comprise the selective call FAX text and graphic information, is stored and ready to be displayed on the display 90.

Figure 5:
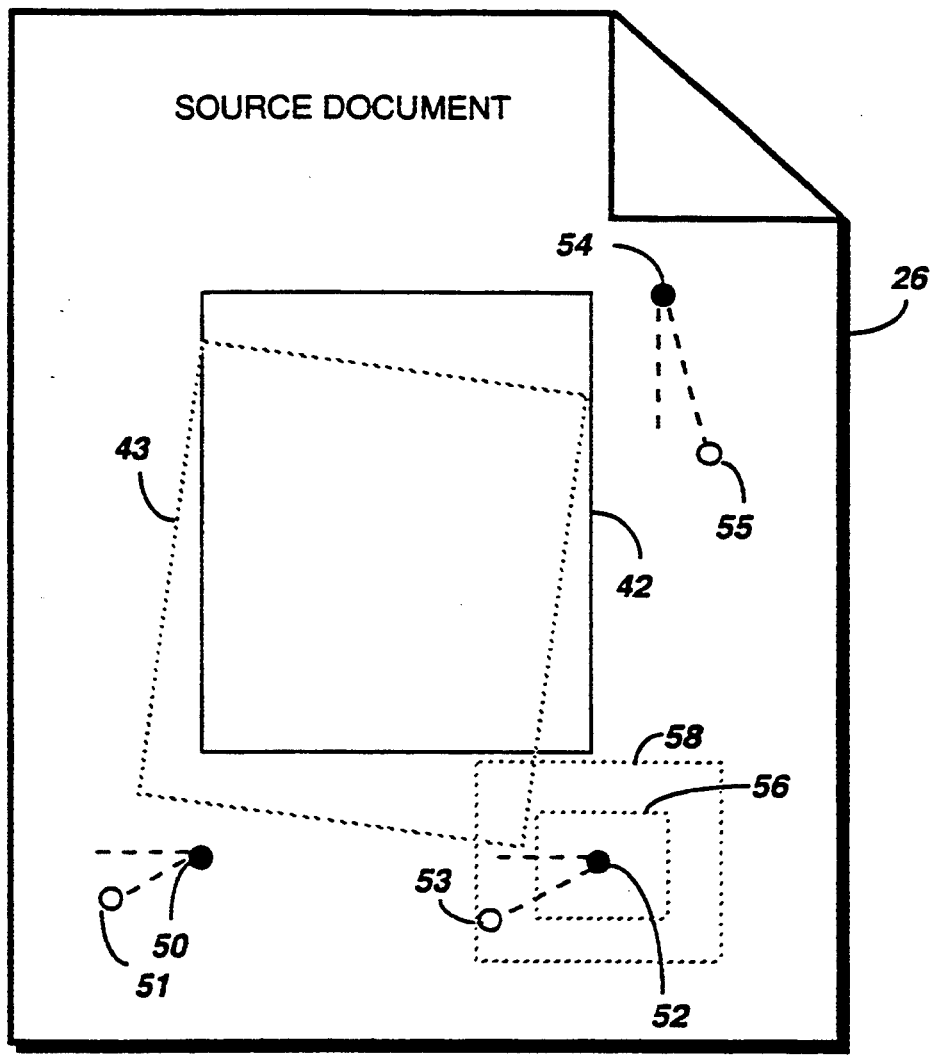
FIG. 5 illustrates a source document according to the preferred embodiment of the present invention.

Referring to FIG. 5, an illustration of the source document is shown according the preferred embodiment of the present invention. The source document 26 illustrates the information region 42 and the at least three markers 50–54. Also, the address for the selective call receiver (pager) to be paged and other system information may be included on the source document although not shown. Additionally, due to errors, for example, alignment, scaling, and rotation, the information region 42 can be shifted. The shift to a new position of the information region 42 is illustrated by a new position of the information region 43, and the shift in the at least three markers 50, 52, 54 are illustrated in new positions of the at least three markers 51, 53, 55. To locate the marker 53, for example, the search sizer 206 (FIG. 2) selects the first search area 56, and the marker locator 204 searches for marker 53. When marker 53, which is marker 52 that has been shifted, is not located, the search sizer 206 selects the next search area 58, and the marker locator 204 continues to search for marker 53. According to the preferred embodiment of the present invention, the first search area 56 has a size of 2.5 centimeters by 2.5 centimeters and the second search area 58 has a size of 5.0 centimeters by 5.0 centimeters.

The advantage of this invention provides a fast processing algorithms with the rotational invariant shape, for example a circle, which is placed around the information region 42. A prototype of the circle is stored in memory for matching by correlation to determine when the circles have been located. After the location of the circles, the rotational angles and the scaling factor are determined from the locations and relative distance between the circles by techniques well known to one skilled in the art. When the orientation and scaling are known, the location of the information region 43 can be easily determined.

Figure 6:
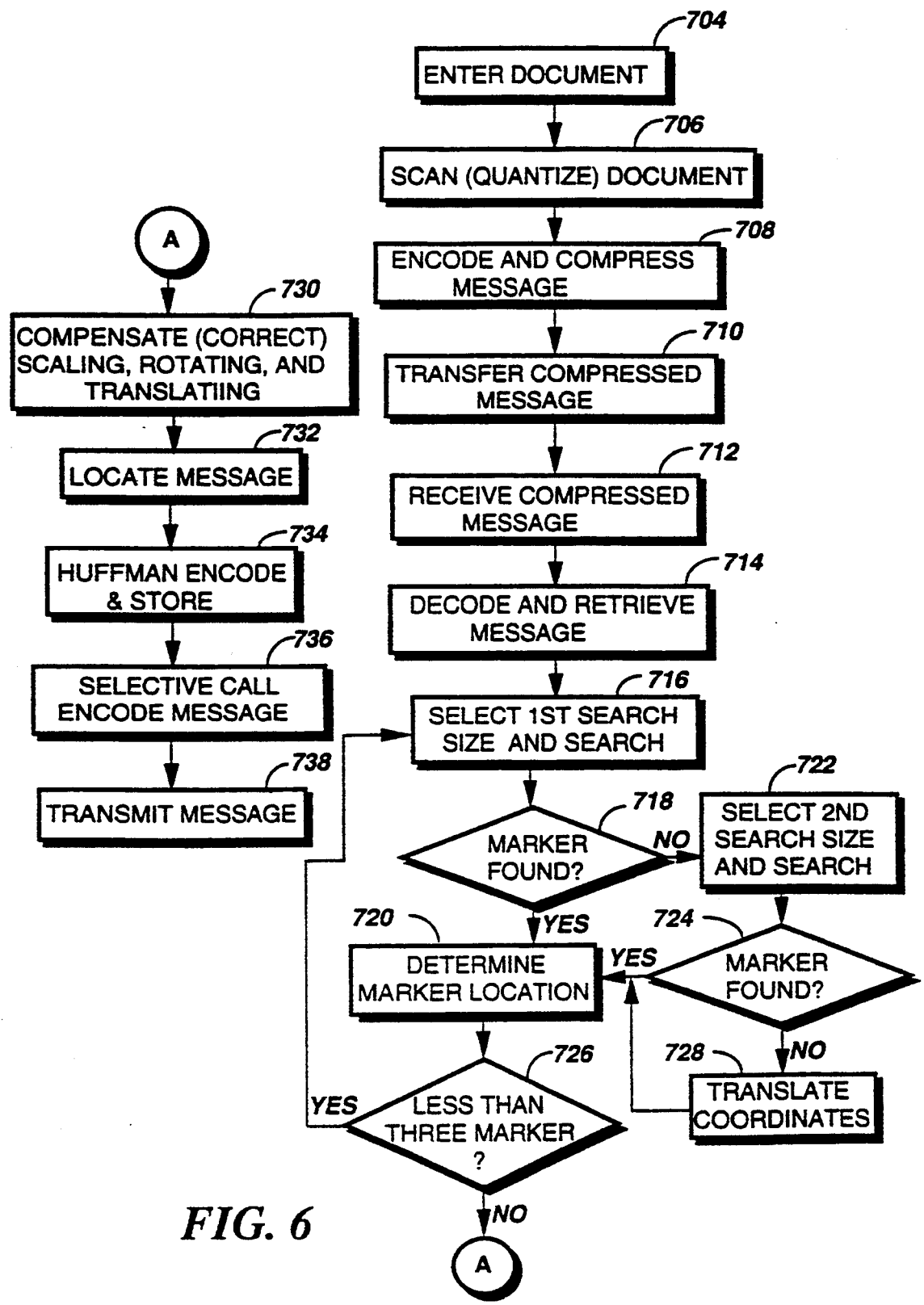
FIG. 6 is a flow diagram illustrating facsimile communication in accordance with the preferred embodiment of the present invention.

Referring to FIG. 6, a flow diagram illustrating facsimile communication is shown in accordance with the preferred embodiment of the present invention. When the source document 26 has been entered, step 704, the FAX machine 14 scans and quantizes the information on the source document 26, step 706. The quantized information is then compressed and encoded, preferably according to the Group III facsimile standard, step 708. The encoded and compressed information is transferred from the FAX machine 14 to the message controller 22 via the PSTN 24, step 710. The message controller 22 receives the compressed information and stores it in memory to be accessed by the processor 20 which processes the compressed information before transmission to its designated selective call receiver 40, step 712. The received information is then decoded from the Group 3 encoded format to retrieve the information, step 714. However, to locate the actual information, at least three markers are placed a predefined location on the source documents for accurately locating the information region even after the information was distorted due to transmission or human errors. The search for the markers are localized in a hierarchical fashion. The processor selects the first search size to begin the search for a first of the at least three markers, step 716. Subsequent to selecting the first search area, the search area is placed in the position which the marker is expected, for example, the center of the first area is placed exactly where the marker is expected, step 716. The entire area is searched, and correlated (or compared) with the prototype marker stored in memory to determine when each marker is found. The search is performed preferably by placing the prototype marker at different locations within the first search area and the result of each location is correlated with the prototype to select the location that best correlates with the marker as the location of the marker. Preferably, a threshold is set to ensure that the integrity of the search is maintained. After the search of the area is completed, step 718 determines if the marker was found in the selected search area. When the marker is not found, a second larger search area is selected and the entire area of the second search area is searched, step 722. After the search of the area is completed step 724 determines if the marker was found in the second search area by correlating (or comparing) the marker with the prototype of the marker that is stored in memory. If the marker is found in step 718 or step 724, the flow continues to step 720, where the location of the marker is determined. However, in step 724, if the marker was not found, the source document is assumed to be transposed approximately 180 degrees (upside-down), and the coordinates are transposed or rotated, step 728.

When the location of a marker is determined in step 720, step 726 checks if the at least three markers were found. If not, the process continues to step 718. When all the markers have been found, the transformation, which comprises scaling, rotation and translation, of the coordinates in the X-Y plane is corrected or compensated for to reduce errors in the location of the information region, step 730. The information region 42 is located and the message is extracted, step 732 and then the message is Huffman encoded and stored, step 734. Subsequently, the message is selective call encoded, step 736, and transmitted to the at least one selective call receiver, step 738.

In this way, the invention searches for the markers in a localized sub regions, starting from a small to a larger search area. This search technique reduces the total area searched approximately by fifty (50) times. Furthermore, the identification of the markers can be only approximate. For example, when searching for the marker, a low resolution image is searched, by downsampling the image by ten (10) resulting in a one hundred (100) times reduction in the number of pixels searched. However, correlation of the marker requires a greater resolution, therefore, during the correlation processing, the image is downsampled by four (4) times instead of ten (10). This reduces the number of pixels searched by sixteen (16) times.

The overall computational savings from this technique is eighty thousands (80,000) times reduction in the amount of computations as compared to a global search at the original FAX resolution. When the markers are found, the rotational angle and the scaling factor are computed to locate the information region. Specifically, when three markers are found, the relative position and distance form each other enable the calculation of the rotational angle and the scaling factors (one for X-axis and one for Y-axis). When decoded, the message elegantly fits within the constraints of the selective call communication without seriously degrading battery life or battery saving features.

Figure 7:
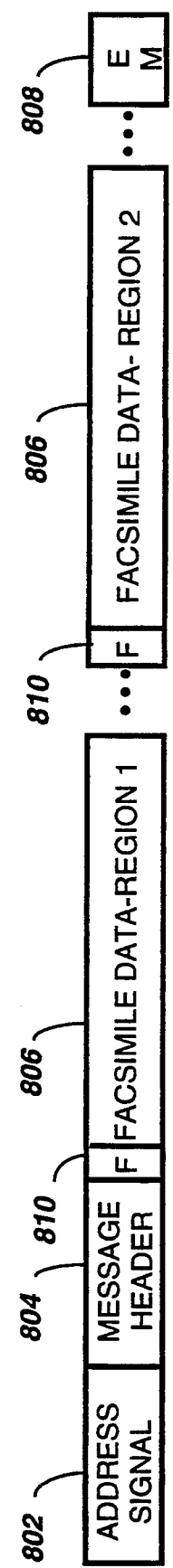
FIG. 7 is a protocol diagram of a selective call information signaling format in accordance with the preferred embodiment of the present invention.

Referring to FIG. 7, a protocol diagram of a selective call communication format is shown in accordance with the preferred embodiment of the present invention. The signaling protocol is used for addressing and transmitting facsimile information to the selective call receiver 40 using any facsimile standard. A FAX paging information packet 800 comprises a selective call address 802, a facsimile message header 804, format or message type identifier 810, data blocks 806 encoded in Group III facsimile data, and an end-of-message flag 808. The end-of-message flag 808 can be omitted without compromising the integrity of this signaling format. The address signal 802 comprises a conventional selective call address of a type that is well known to one of ordinary skill in the art. The message header 804 contains information on the data block length, FAX protocol type, a data flag to determine if a FAX or a regular paging message is being received and possibly an encryption type for use in a secure FAX messaging system. Following the message header 804 is the format identifier 810 which identifies whether the following information is ASCII text or bit-map graphic image. Following the format identifier 810 is the data block 806 containing standard facsimile data of the format or type indicated by the format identifier. This embodiment can be used in conjunction with a conventional FAX machine to receive FAX messages via a wireless data channel. Furthermore, when used in conjunction with a personal computer or the like (e.g., a laptop computer), the selective call receiver as illustrated in FIG. 3 can couple the received FAX message data to the computer for storage in a file, thus allowing the user to have an archive of the received FAX messages. Since the received FAX message data is unaltered from its native transmission format, conventional facsimile data manipulation hardware and software can be used to obtain a hardcopy of the received FAX.

Figure 8:
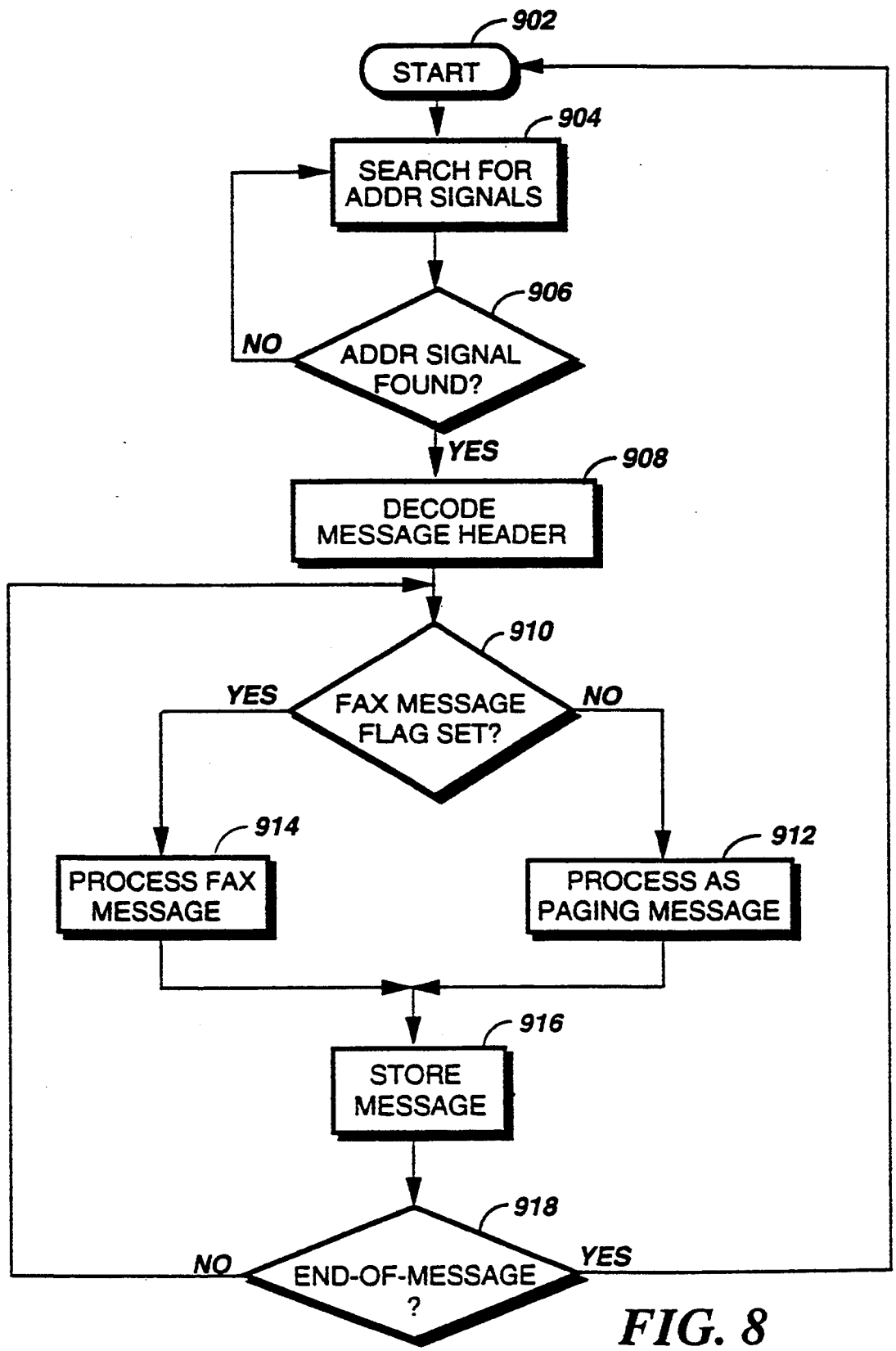
FIG. 8 is a flow diagram illustrating the operation of the selective call receiver in FIG. 3.

Referring to FIG. 8, the flow diagram illustrates the receiving operation of the selective call receiver of FIG. 3. The process of receiving a selective call message begins at step 902. In step 904, the address decoder searches a received signal for an address signal. Step 906 tests any recovered address signals to determine if they correlate with at least one predetermined address associated with the selective call receiver 40. If the received address does not correlate (match), control is returned to step 904 and a new search is performed. When a received address correlates with at least one predetermined address associated with the selective call receiver, step 908 decodes the message header then passes control to step 910. Step 910 tests for the presence of a FAX data flag. If step 910 is false, the following data block will contain symbols that will be decoded as a conventional paging message, step 912. When decoding is complete, step 916 stores the data and step 918 tests for an end of message condition which may be indicated by an end-of-message marker or the lack of another data flag. If step 918 is false (not yet at end of message) and step 910 is true, the following data block will contain a FAX message. The FAX message is decoded, step 914, and stored, step 916. When step 918 is true, control is returned to step 902 and the address decoder resumes searching for valid addresses.

The decoding of a text, symbol, or FAX data block is accomplished by applying the inverse of the procedures discussed above. To display the received FAX message, each coded section is decoded and their respective positions mapped into the presentation device's display memory. After mapping the storing rectilinear coordinates into the presentation device's display space, message is re-assembled, at least one section, into a recovered document that substantially resembles the format of the original source document and the recovered document is presented.

In this way, the FAX message is encoded and transmitted to the designated selective call receiver. The selective call receiver, upon detecting its address, receives the FAX message which is stored and presented to the user on the display of the selective call receiver.

In summary, the preferred embodiment of the present invention comprises a method of facsimile communication, in a selective call communication system, which comprises the steps of (a) retrieving information from a source document. The source document includes the information located relative to at least three markers. The method further comprises the steps of: (b) encoding and compressing the information; (c) transferring the information and the at least three markers to a selective call terminal; (d) receiving the information and the at least three markers at the selective call terminal; (e) processing the information and the at least three markers. The step of processing in the selective call terminal further comprises the steps of (f) searching for the at least three markers. The step of searching further comprising the steps of: (f1) selecting a first search area for searching for a marker of the at least three markers; (f2) increasing the first search area to a second search area when the marker is not found within the first search area; (f3) correlating the marker with a stored marker; and (f4) transposing coordinates of a location of the marker when the marker is not found within the first and second search areas; (g) determining a location of the information in response the step (f) of searching; and (h) compensating for a translation, rotation, and scaling of the information in response to a determined location of the markers. A step (i) of transmitting transmits the information being processed to an at least one selective call receiver. The step of transmitting further comprises a step of selective call encoding and compressing the information for transmission to the at least one selective call receiver.

In this way, the invention searches for the markers in a localized sub regions, starting from a small to a larger search area. This search technique reduces the total area searched approximately by fifty (50) times. Furthermore, the identification of the marker can be only approximate. For example, when searching for the marker, a low resolution image is searched, by down-sampling the image by ten (10) resulting in a one hundred (100) times reduction in the number of pixels searched. However, correlation of the markers requires a greater resolution, therefore, during the correlation processing, the image is downsampled by four (4) times instead of ten (10). This reduces the number of pixels searched by sixteen (16) times.

The overall computational savings from this technique is eighty thousands (80,000) times reduction in the amount of computations as compared to a global search at the original FAX resolution. When the markers are found, the rotational angle and the scaling factors (one for the X axis and another for the Y axis) are computed to locate the information region. Specifically, when three markers are found, the relative position and distance form each other enable the calculation of the rotational angle and the scaling factors. When decoded, the message elegantly fits within the constraints of the selective call communication without seriously degrading battery life or battery saving features.

What is claimed is:

1. In a selective call communication system, a method of facsimile communication, comprising the steps of:
    (a) retrieving information from a source document, the source document includes the information being located relative to at least three markers;
    (b) encoding and compressing the information;
    (c) transferring the information and the at least three markers to a selective call terminal;
    (d) receiving the information and the at least three markers at the selective call terminal;
    (e) processing the information and the at least three markers, the step of processing in the selective call terminal further comprises the steps of:
    (f) searching for the at least three markers, said step of searching comprises the steps of:
        (f1) selecting a first search area for searching for a marker of the at least three markers; and
        (f2) increasing the first search area to a second search area when the marker is not found within the first search area;
    (g) determining a location of the information in response the step (f) of searching; and
    (i) transmitting the information being processed to an at least one selective call receiver.

2. The method according to claim 1 wherein said step (i) of transmitting further comprising a step of selective call encoding and compressing the information for transmission to the at least one selective call receiver.

3. The method according to claim 1 wherein said step (f) of searching further comprising a step of comparing the marker with a stored marker.

4. The method according to claim 1 wherein said step (f) of searching further comprising a step of transposing coordinates of a location of the marker when the marker is not found within the first and second search areas.

5. The method according to claim 1 wherein said step (e) of processing further comprising a step of compensating which compensates for a translation, rotation, and scaling of the information in response to the location of the marker.

6. A selective call communication system, comprising:
    a scanner for retrieving information from a source document, the source document includes the information being located relative to at least three markers; the scanner further comprising:
        an encoder for encoding and compressing the information; and
        a modem, coupled to said encoder, for transferring the
    information and the at least three markers to a selective call terminal; the selective call terminal, comprising:
        a receiver for receiving the information and the at least three markers; and
        a processor, coupled to said receiver, for processing the information and the at least three markers, the processor further comprising:

a marker locator for searching for the at least three markers, the marker locator further comprises a search sizer for selecting a first search area for searching for a marker of the at least three markers, said search sizer increases the first search area to a second search area when the marker is not found within the first search area; and a determinator, coupled to said marker locator, for determining a location of the information; and a transmitter, coupled to the processor, for transmitting the information being processed to an at least one selective call receiver.

7. The selective call communication system according to claim 6 wherein said transmitter further comprising a selective call encoder that encodes and compresses the information for transmission to the at least one selective call receiver.

8. The selective call communication system according to claim 6 wherein said marker locator further comprising a correlator for correlating the marker with a stored marker.

9. The selective call communication system according to claim 6 wherein said marker locator further comprising a document transposer for transposing coordinates of a location of the marker when the marker is not found within the first and second search areas.

10. The selective call communication system according to claim 6 wherein said processor further comprising a transformer which compensates for a translation, rotation, and scaling of the information in response to a determined location of the marker.

11. In a selective call communication system, a method of facsimile communication, comprising the steps of:

(a) retrieving information from a source document, the source document includes the information being located relative to at least three markers;

(b) encoding and compressing the information;

(c) transferring the information and the at least three markers to a selective call terminal;

(d) receiving the information and the at least three markers at the selective call terminal;

(e) processing the information and the at least three markers, the step of processing in the selective call terminal further comprises the steps of:

(f) searching for the at least three markers, said step of searching further comprising the steps of:

(f1) selecting a first search area for searching for a marker of the at least three markers;

(f2) increasing the first search area to a second search area when the marker is not found within the first search area;

(f3) correlating the marker with a stored marker; and (f4) transposing coordinates of a location of the marker when the marker is not found within the first and second search areas;

(g) determining a location of the information in response the step (f) of searching; and (h) compensating for a translation, rotation, and scaling of the information in response to a determined location of the marker;

(i) transmitting the information being processed to an at least one selective call receiver, said step of transmitting further comprises a step of selective call encoding and compressing the information for transmission to the at least one selective call receiver.

12. A selective call communication system, comprising:

a scanner for retrieving information from a source document, the source document includes the information being located relative to at least three markers; the scanner further comprising:

an encoder for encoding and compressing the information; and a modem, coupled to said encoder, for transferring the information and the at least three markers to a selective call terminal; the selective call terminal, comprising:

a receiver for receiving the information and the at least three markers; and a processor, coupled to said receiver, for processing the information and the at least three markers, the processor further comprising:

a marker locator for searching for the at least three markers, said marker locator further comprises:

a search sizer for selecting a first search area for searching for a marker of the at least three markers, said search sizer increases the first search area to a second search area when the marker is not found within the first search area;

a correlator, coupled to said search sizer, for correlating the marker with a stored marker;

an X-Y transformer, coupled to said correlator, for transforming coordinates of a location of the marker when the marker is not found within the first and second search areas; and said transformer compensating for a translation, rotation and scaling of the information in response to a determined location of the marker;

a determinator, coupled to said marker locator, for determining a location of the information; and a transmitter, coupled to the processor, for transmitting the information being processed to an at least one selective call receiver, said transmitter further comprises a selective call encoder that encodes and compresses the information for transmission to the at least one selective call receiver.

* * * * *